Patented May 11, 1954

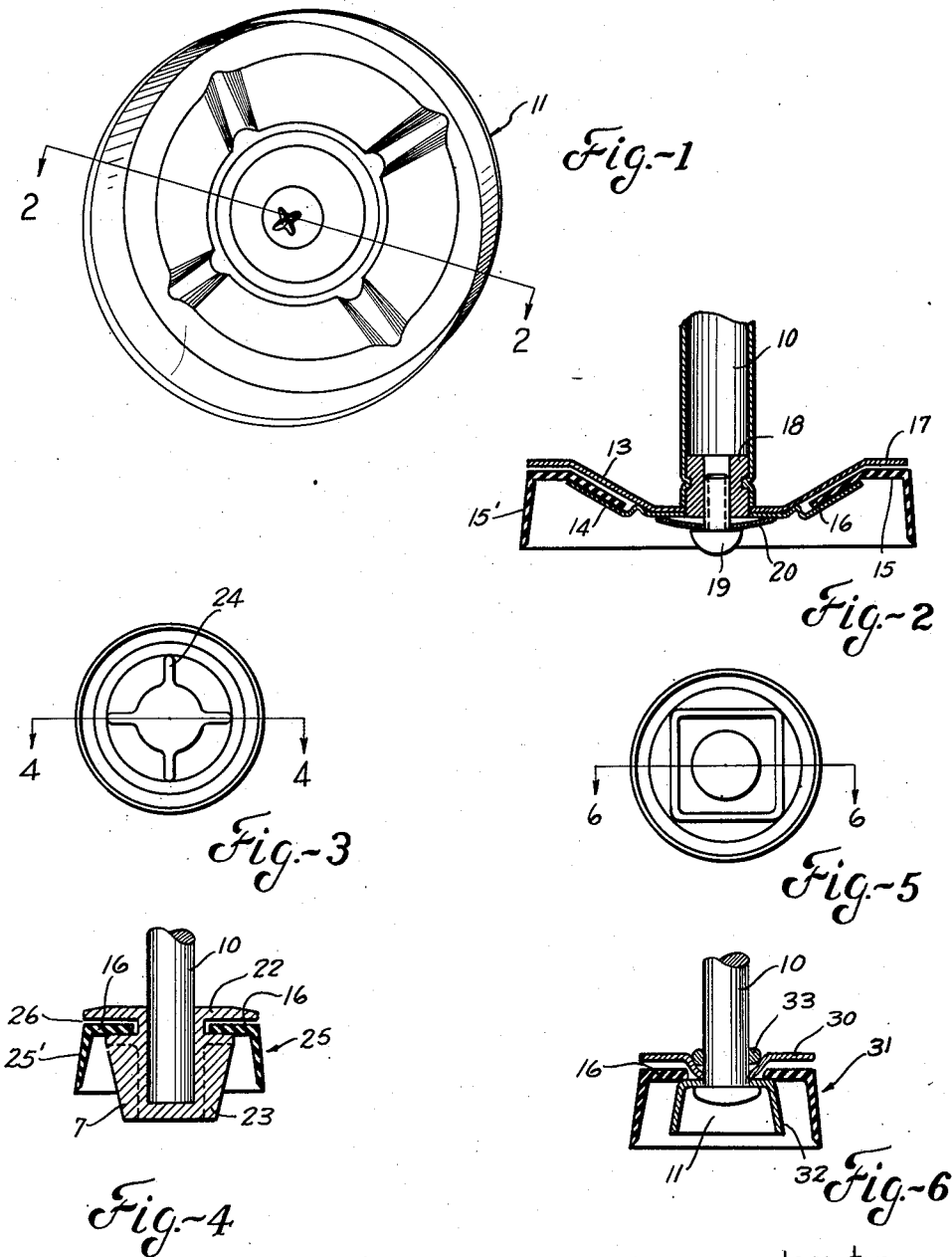

2,678,248

UNITED STATES PATENT OFFICE 2,678,248

PUMP PISTON

George E. Peters and Linus E. Russell, Springfield, Ohio, assignors to Peters & Russell, Inc., Springfield, Ohio, a corporation of Ohio Application December 3, 1948, Serial No. 63,244

3 Claims. (Cl. 309—33)

This invention relates to pumps, and more particularly to a piston assembly for use therein.

While the invention is primarily concerned with manually operated air pumps of the well-known "tire pump" variety, it is not necessarily limited thereto, but has been found advantageous in other types of reciprocating piston pumps.

To meet the requirements and demands of the public, such pumps must be of light weight, but of sturdy construction and capable of being economically manufactured and assembled so that they may be sold at a minimum price. At the same time such pumps must be efficient in use and have a long useful life.

The object of the invention is to improve the construction as well as the means and mode of manufacture of pump pistons, whereby they may not only be economically manufactured, but will be strong and sturdy in construction, of compact form, capable of withstanding rough usage, of light weight, having but few parts, and be unlikely to get out of repair.

A further object of the invention is to provide an improved piston cup gasket and mounting therefor.

A further object of the invention is to provide a freely mounted or "floating" type cup gasket which will automatically center itself within the pump cylinder.

A further object of the invention is to provide a simplified mounting for the cup gasket having relatively few parts and easily assembled.

A further object of the invention is to provide a piston assembly possessing the advantageous structural features, the inherent meritorious characteristics and the method of assembly herein disclosed.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a perspective view of a large size piston embodying the present invention;

Fig. 2 is a sectional elevation thereof taken on line 2—2 of Fig. 1;

Fig. 3 is a bottom view of a modified form of piston assembly;

Fig. 4 is a sectional elevation thereof taken on line 4—4 of Fig. 3;

Fig. 5 is a bottom view of a further modified form of piston assembly, the same inventive concept, and Fig. 6 is a sectional elevation thereof taken on line 6—6 of Fig. 5.

Like parts are indicated by similar characters of reference throughout the several views.

Referring to the accompanying drawing, there is shown in the several views a portion of a piston rod 10 to the end of which a piston head assembly 11 is secured.

In Figs. 1 and 2 the piston assembly 11 is of relatively large size and in connection therewith the rod 10 is usually hollow so as to reduce the weight thereof. The assembly 11 of Figs. 1 and 2 comprises a concave disc-like head 13 and a cooperating concave washer 14, the periphery of which is located in relatively spaced relation with the head 13. Located intermediate the spaced periphery of the washer 14 and the head 13 is an annular cup-shaped gasket 15, a dependent flange 15' thereon engaging the walls of a pump cylinder in which the piston assembly is used. The outer edge of the head 13 overlies the top of the gasket, thereby affording a backing area therefor as shown at 17.

It should be noted, however, that when assembled on the rod 10 the gasket 15 is not fixedly clamped intermediate the head 13 and washer 14. It is, to the contra, freely supported therebetween and therefore capable of both lateral and rotary shifting motion relative to the piston head and shaft.

In mounting the piston head assembly on a hollow piston rod as shown in Fig. 2, a plug 18 is secured in the end of the rod and the head 13 and washer 14 is secured thereto by a screw or rivet 19 acting through a compression member 20. The piston assembly is maintained in alignment with the rod 10 by the plug 18 and movement of the assembly along the rod 10 is prevented by its engagement against the end of the rod, in which position the assembly is maintained under the influence of the compression member 20 and attaching means 19.

In Figs. 3 and 4 there is shown a modification embodying the same principle of a floating cup gasket. In this particular form adaptable to smaller size pumps, the piston head comprises a peripherally grooved collar 22 provided with an integral hub 23 from which project peripherally spaced tapered ribs 24. The hub is cut away to form the ribs 24 merely to reduce weight, and facilitate its manufacture. The piston head is fixedly secured upon the end of the rod 10 by pressing it thereon or by swedging. An annular cup-shaped gasket 25 having a dependent skirt or flange 25' is engaged in the peripheral groove 26 of the collar 22. Sufficient clearance is again provided within the groove 26 to permit both lateral and rotary shifting movement of the gasket relative to the head.

In Figs. 5 and 6 there is shown a further modification which is quite similar in construction to that shown in Figs. 3 and 4, except that the piston head assembly consists of a plurality of members intermediate which the cup gasket is supported. In this particular form of the invention a disc-like head 30 having a centrally disposed concavity therein is placed upon the rod 10. An annular cup-shaped gasket 31 having a dependent skirt or flange 31' is then placed over the end of the rod and a final cup-shaped clamping member 32 is placed over the end of the rod 10. The entire assembly is then placed in a small press where the rod 10 is upset against the cup 32 and simultaneously therewith an enlargement 33 is formed on the rod 10 in spaced relation with the end thereof. The spacing intermediate the deformation 33 and the upset end of the rod is such that the disc 30 and cup 32 are maintained in relative fixed position while permitting free lateral and rotary shifting of the gasket 31 therebetween.

In all of the embodiments of the present invention the cup gaskets may be of either rubber or leather, but preferably are formed from a synthetic rubber type material impervious to the effects of oil or other lubricants, of which there are several suitable varieties now available upon the open market. The top portion 16 of the cup gasket which lies within the groove in the piston head assembly is slightly thickened in relation to the thickest portion of the gasket flange so as to increase the strength and reduce the flexibility thereof.

In assembling the piston head, the cup gasket may either be placed in its proper position during the assembly of the various parts of the head (Figs. 1, 2, 5 and 6) or the head may be completely assembled on the rod prior to the introduction of the cup gasket therein (Figs. 3 and 4). In the latter case the gasket is placed in the groove 26 (Figs. 3 and 4) or intermediate the members 13—14 (Figs. 1 and 2) or members 3—32 (Figs. 5 and 6) by expanding the top wall of the gasket over one side of the piston head into the space intermediate the supporting members, whereupon the opposite side of the gasket may also be placed within the groove in its normal position. In many instances the latter method of assembly is preferable since it obviates any chance of damaging the gasket during subsequent assembly operations.

The present application is a continuation-in-part of our copending application Serial No. 559,537, filed October 20, 1944, now matured into Letters Patent No. 2,455,946, issued December 14, 1948, the present application being directed particularly to the piston head assembly shown therein.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

We claim:

1. A piston assembly for an air pump or the like, including an annular cup gasket comprising a relatively thick top portion and a relatively thin tapering dependent flange, supporting means therefor comprising a body portion including a lower body portion of less diameter than the cup gasket about which the dependent flange of the cup projects in relatively spaced relation thereto, and an upper body portion of substantially the same diameter as the cup gasket, the periphery of which is located in relatively spaced relation with the lower body portion forming therebetween a peripheral groove in said body portion within which groove the relatively thick top portion of the cup gasket is received and supported for self-adjusting movements in longitudinal, lateral and rotary directions relatively to said body portion.

2. A piston assembly for an air pump or the like including a piston head comprising a peripherally grooved collar having upper and lower portions of respectively different diameter above and below the groove therein, a cup gasket having an annular head engageable with the peripheral groove of the collar by being expanded over one side thereof, and a conical skirt having tapered walls carried by the annular head and surrounding the lower portion of the peripherally grooved collar in spaced relation therewith, said annular head further being in radially spaced relation to said collar whereby said gasket has freedom of both rotary and lateral adjustment relative to said piston head.

3. A piston assembly for an air pump or the like including a piston head comprising a peripherally grooved collar, a radially flanged hub therefor, and a cup gasket therefor, including an annular head engageable within the peripheral groove and a dependent conical skirt carried thereby and surrounding the radially flanged hub in relatively spaced relation, the thickness of the annular head of said cup gasket being less than the width of said peripheral groove to provide for relative shifting motion of said gasket in a longitudinal direction and said annular head further being in radially spaced relation to said collar to provide for relative shifting motion of said gasket in a lateral direction.

References Cited in the file of this patent

UNITED STATES PATENTS

| Number | Name | Date |
| --- | --- | --- |
| 138,633 | Gifford | May 6, 1873 |
| 1,376,863 | Drew | May 3, 1921 |
| 1,379,492 | Wagner | May 24, 1921 |
| 1,606,511 | Carson | Nov. 9, 1926 |
| 1,700,091 | Bruce | Jan. 22, 1929 |
| 1,769,984 | Bockius | July 8, 1930 |
| 2,142,712 | Brandt | Jan. 3, 1939 |
| 2,186,664 | Brown | Jan. 9, 1940 |
| 2,293,564 | Schnell | Aug. 18, 1942 |